Aug. 30, 1932.  D. S. FAULKNER ET AL  1,874,264
MULTIPLE SPEED GEAR DRIVEN DRILLING CONTROL
Filed June 1, 1931   7 Sheets-Sheet 1
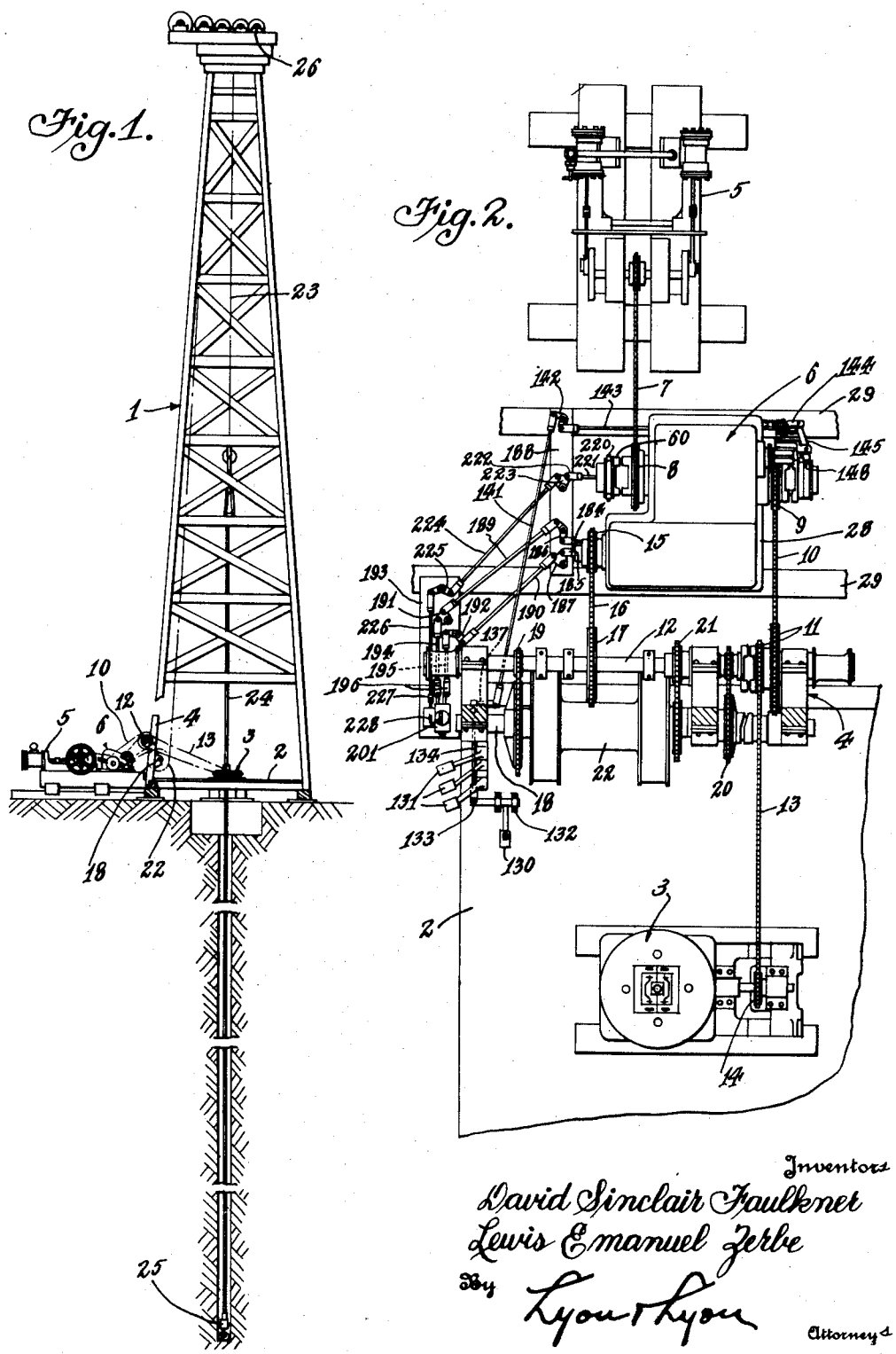
Inventors
David Sinclair Faulkner
Lewis Emanuel Zerbe
By Lyon & Lyon
Attorneys

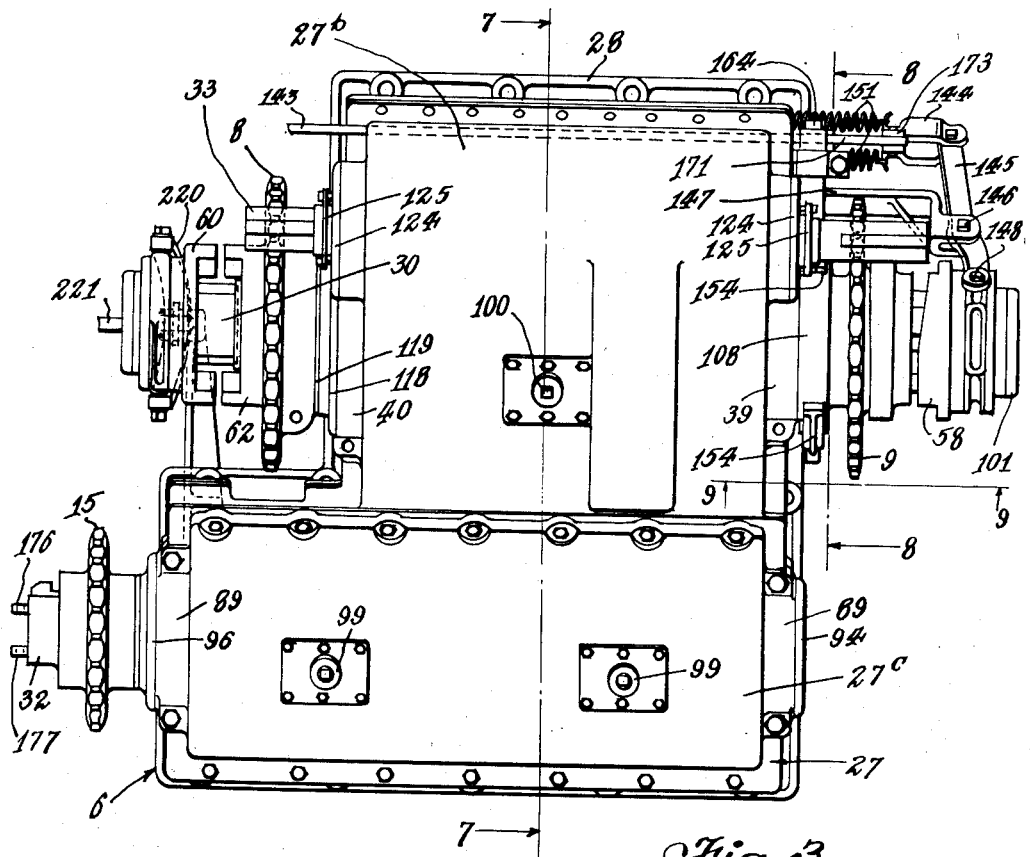
Fig. 3.
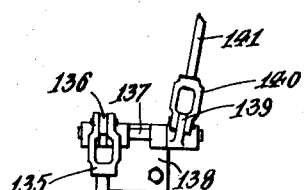
Fig. 15.
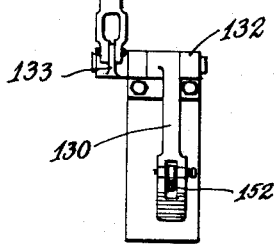

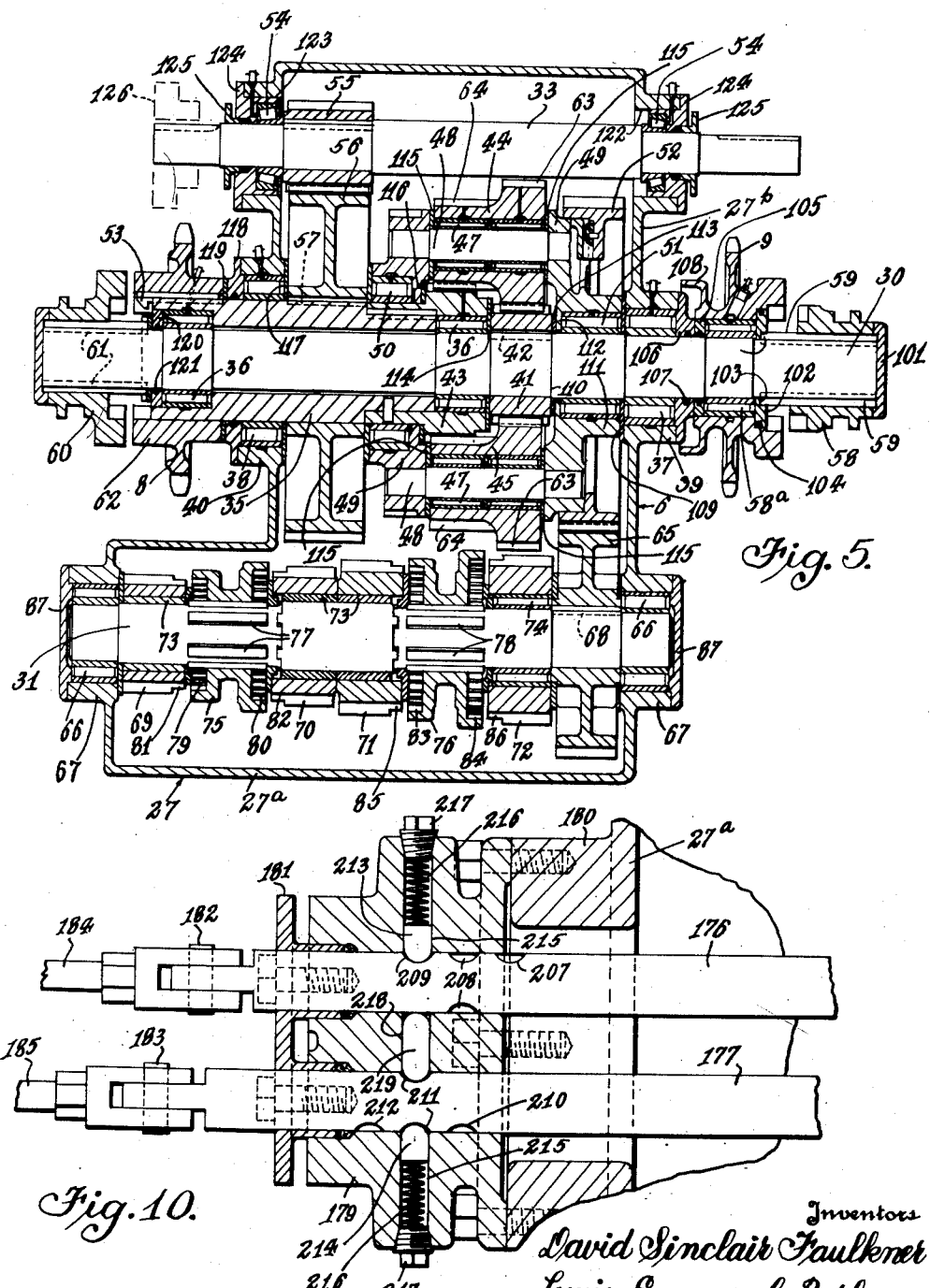

Aug. 30, 1932.  D. S. FAULKNER ET AL  1,874,264
MULTIPLE SPEED GEAR DRIVEN DRILLING CONTROL
Filed June 1, 1931    7 Sheets-Sheet 5

Inventors
David Sinclair Faulkner
Lewis Emanuel Zerbe
By Lyon & Lyon
Attorneys

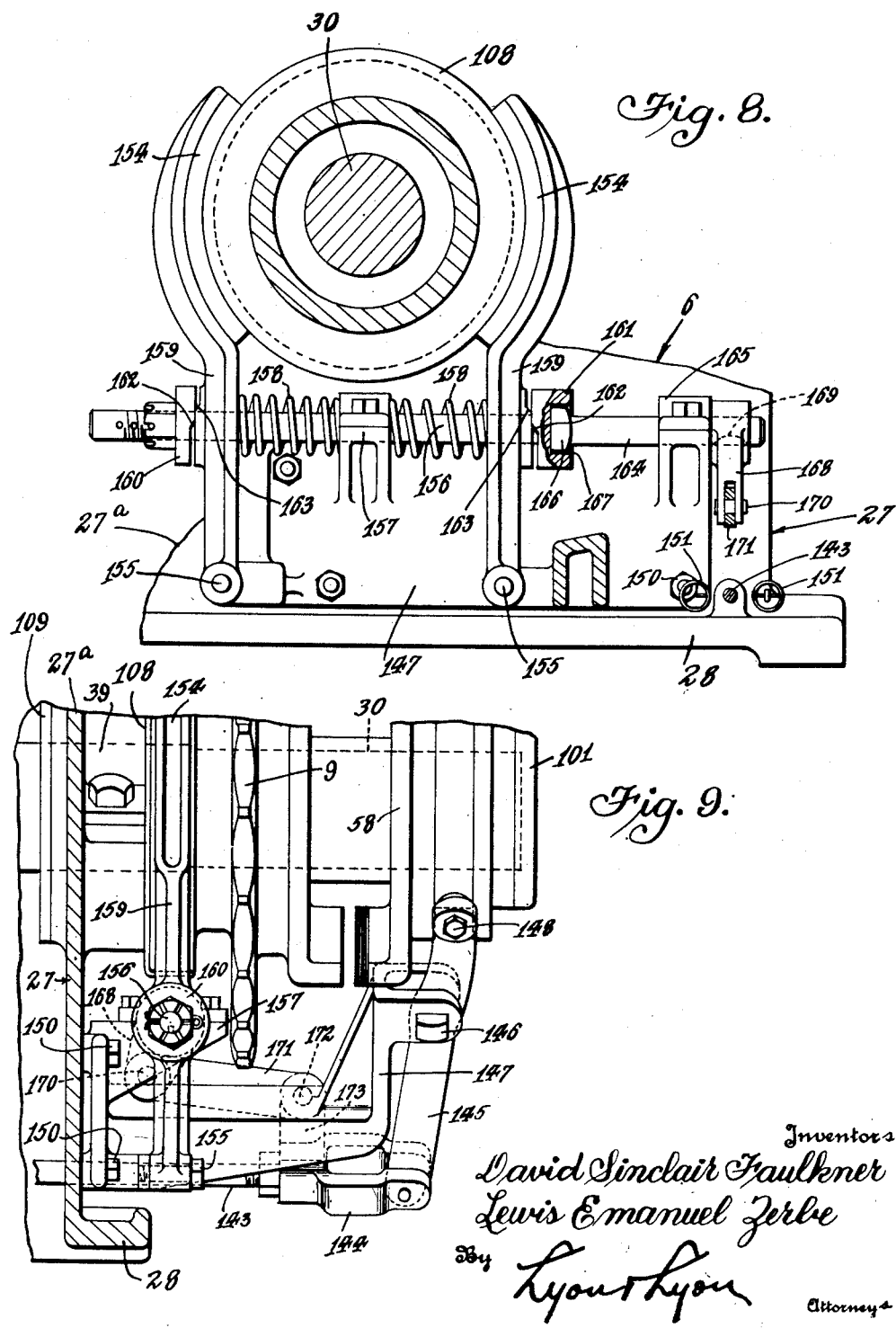

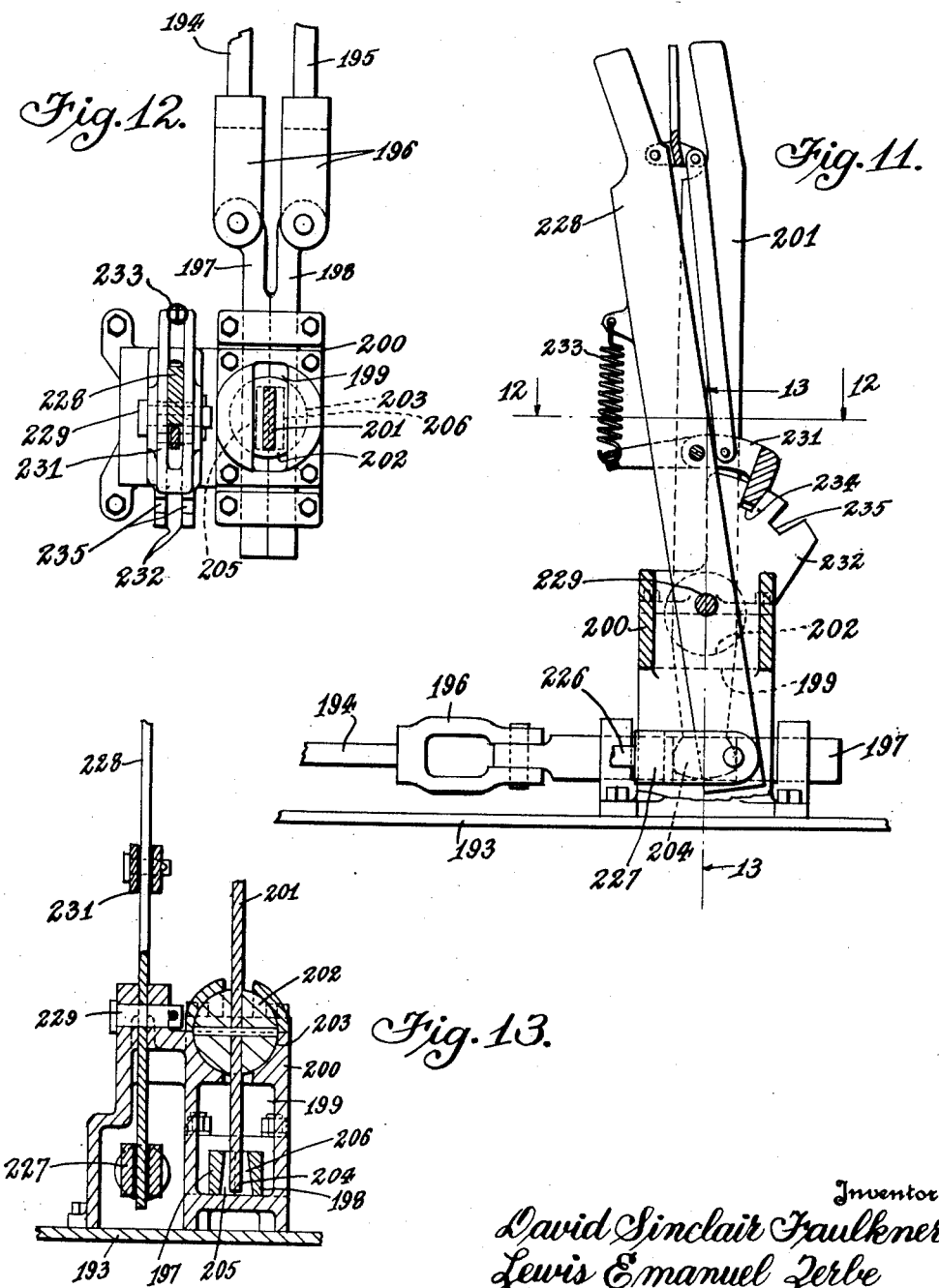

Patented Aug. 30, 1932

1,874,264

UNITED STATES PATENT OFFICE

DAVID SINCLAIR FAULKNER, OF LOS ANGELES, AND LEWIS EMANUEL ZERBE, OF MONETA, CALIFORNIA, ASSIGNORS TO THE NATIONAL SUPPLY COMPANY, OF TOLEDO, OHIO, A CORPORATION OF OHIO

MULTIPLE SPEED GEAR DRIVEN DRILLING CONTROL

Application filed June 1, 1931. Serial No. 541,270.

This invention relates to multiple speed gear driven drilling controls, and is more particularly related to a multiple speed control means for use in connection with apparatus employed in the rotary method of drilling deep wells, such as oil wells.

This invention is directed to an improvement in the structure disclosed in Letters Patent No. 1,785,238 dated December 16, 1930 for apparatus for drilling wells.

In the drilling of wells using the rotary method, a drill stem is employed which is rotated from the surface of the ground to rotate the drill or bit carried thereby. The drill stem thus rotated is suspended in a derrick by means of a cable wound on the hoisting drum of a rotary drawworks. In the type of control apparatus herein referred to, the weight imposed by the drill stem on the drill bit is proportioned to the torque set up in the drill stem so as to prevent twist-offs of the drill stem as the resistance to the rotation of the drill bit varies.

In the drilling of a well, many different formations are encountered which vary from soft, loose sand, through a sticky clay or gumbo, to hard rock, requiring for efficient operation many different conditions of operation of the apparatus for drilling the well. The speed of rotation of the drill stem, or the torque imposed thereto, should be related to the weight imposed upon the drill bit, and this relationship, in order to obtain effective operation, varies widely as different types of formation are encountered.

It is an object of this invention to provide a drill control apparatus of a gear driven type which provides a means for proportioning the load imposed on the drill bit to the torque of the drill stem and provides a multiple speed drive permitting quick and easy change of the speed of rotation of the drill stem as different types of formation are encountered in the drilling of the well.

In order to obtain efficiency in operation, another object of this invention is to provide a completely enclosed drilling control apparatus which is of comparatively inexpensive construction and is susceptible of easy operation, and which may be easily coupled or connected to the apparatus employed in carrying out the rotary process of drilling wells with a minimum of modification or change in such apparatus.

Another object of this invention is to provide a multiple speed gear driven drilling control which is constructed as a self-contained unit and includes a planetary gear formed of differential mechanism for proportioning the load imposed upon the drill bit in relation to the torque produced in the drill stem, and which likewise includes a simple form of change speed mechanism whereby the speed of operation may be easily varied to provide for the most efficient conditions of operation as different strata are encountered in the drilling operation.

Other objects and advantages of this invention it is believed will be apparent from the following detailed description of a preferred embodiment thereof as illustrated in the accompanying drawings.

In the drawings:

Figure 1 is a side elevation of a rotary drilling rig illustrating a drilling control embodying our invention as adapted thereto.

Figure 2 is a top plan view of a rotary drilling apparatus illustrating a drilling control embodying our invention as coupled thereto.

Figure 3 is a top plan view of the drilling control embodying our invention.

Figure 5 is a sectional plan view taken substantially on the line 5—5 of Figure 4.

Figure 8 is a fragmental sectional view taken substantially on the line 8—8 of Figure 3 showing the rotary sprocket brake mechanism.

Figure 9 is an enlarged fragmental plan view of the rotary sprocket clutch and shifting mechanism therefor.

Figure 10 is a fragmental sectional view of the clutch shifter mechanism utilized in shifting the multiple jaw double end clutches on the clutch gear shaft.

Figure 11 is a fragmental view partly in section of the clutch shifter levers utilized for the shifting of the quill shaft clutch and the gear shaft clutches embodied in our invention.

Figure 12 is a sectional view taken substantially on the line 12—12 of Figure 11.

Figure 13 is a sectional view taken substantially on the line 13—13 of Figure 11.

Figure 15 is a fragmental plan view of the rotary sprocket clutch shifter mechanism and connections embodied in this invention.

Figure 4:
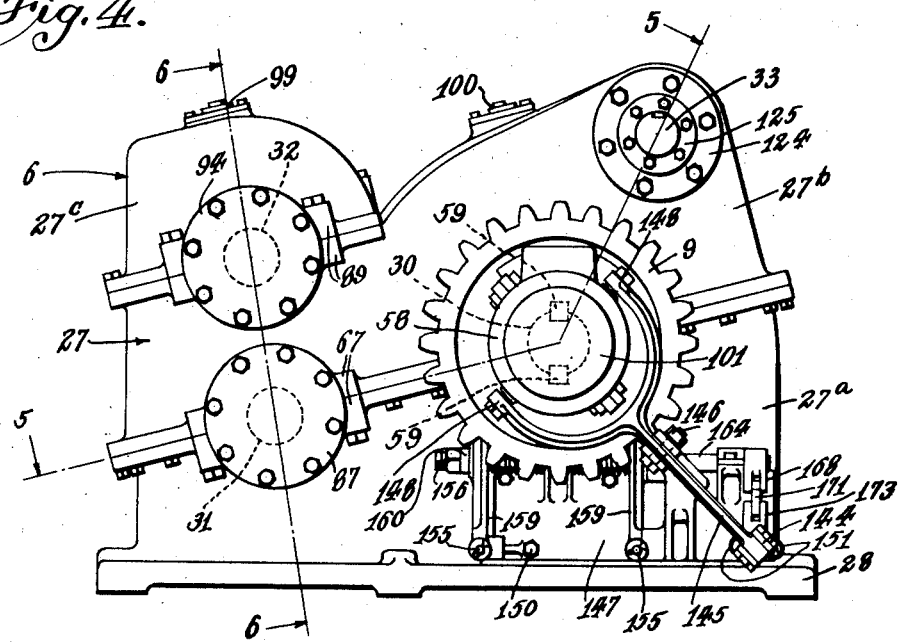
Figure 4 is a side elevation thereof.
Figure 6:
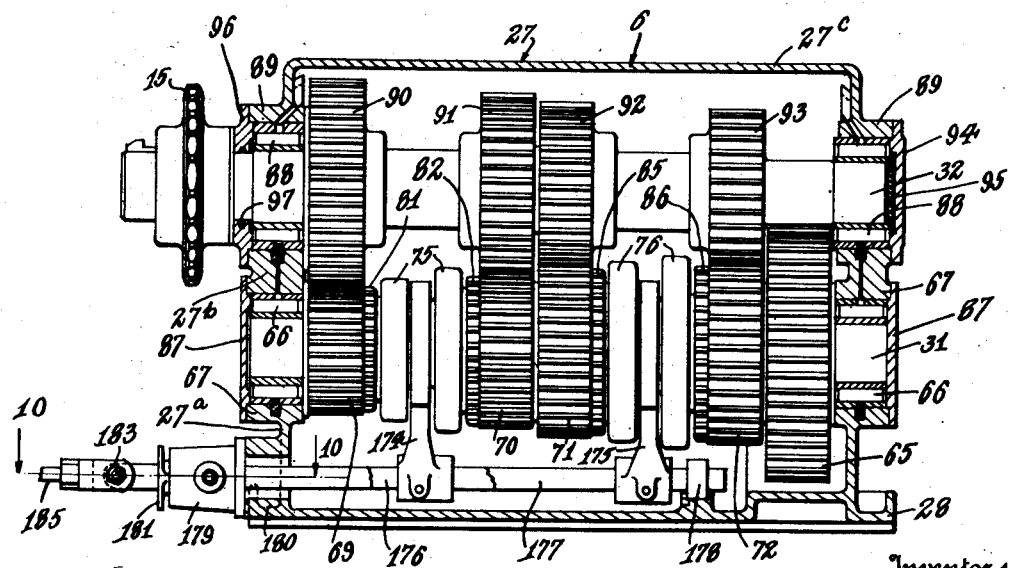
Figure 6 is a sectional end view taken substantially on the line 6—6 of Figure 4.
Figure 7:
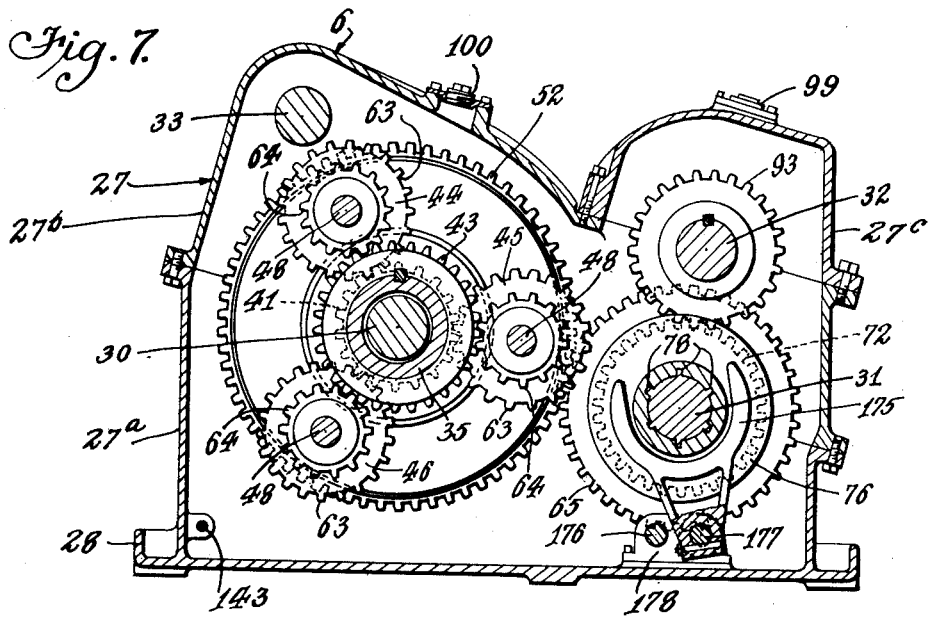
Figure 7 is a sectional end view taken substantially on the line 7—7 of Figure 3.

In the preferred embodiment of our invention illustrated in the accompanying drawings, 1 indicates a well derrick, on the floor 2 of which is mounted a rotary machine 3 of any suitable or desirable construction, and a rotary drawworks 4.

The rotary drawworks 4 is likewise of any suitable or desirable construction, many forms of which are well understood in the art.

An engine or prime mover 5 is mounted outside of the derrick 1 and interposed between the prime mover 5 and the drawworks 4 is a rotary drilling control 6. The prime mover 5 is connected by means of a drive chain 7 to a drive sprocket 8 of the drilling control 6. The drilling control 6 is connected on the rotary drive sprocket 9 by means of a chain 10 through a double idler sprocket 11 mounted on the line shaft 12 of the drawworks 4 through a chain 13 to the drive sprocket 14 of the rotary machine 3.

The drilling control 6 is connected to the drawworks drive sprocket 15 by means of a chain 16 to the driven sprocket 17 mounted on the line shaft 12 of the drawworks. The line shaft 12 is connected to the drum shaft 18 by means of a plurality of sprocket and chain connections 19, 20 and 21, providing a multiple change speed connection between the line shaft 12 and the drum shaft 18 for driving the hoisting drum 22. A supporting cable 23 for the drill stem 24 passes over the crown block 26 of the derrick 1 and is reeled on the hoisting drum 22 so that the drill stem 24 and the bit 25 carried thereby are supported either on the bottom of the hole being drilled or by the cable 23 wound around the hoisting drum 22.

The drilling control 6 is preferably of the following construction:

A housing 27 formed in three parts; a lower gear housing 27a, a central gear housing 27b, and a gear housing cover 27c are provided. The lower gear housing 27a is formed with a base flange 28 through which a plurality of bolts are passed to anchor the housing 27 to the skids 29. The housing 27 encloses normally four shafts, the differential gear shaft 30, a clutch gear shaft 31, a take-off shaft 32, and a motor reduction gear shaft 33. The three portions of the housing 27 are formed so that the housing is divided on a plane passing through the centre of the shafts 30 and 31 forming the lower gear housing 27a. The central gear housing 27b is formed on a plane passing through the center of the take-off shaft 32. The three portions of the housing 27 are flanged at their connecting edges and bolted together to form a fluid-tight housing for the control.

The differential shaft 30 is mounted in the housing 27, and a quill shaft 35 is journaled on the shaft 30 on roller bearings 36 disposed at the opposed ends of the quill shaft 35. The shaft 30 and the quill shaft 35 are supported in the housing 27 on roller bearings 37 and 38.

The bearings 37 and 38 are mounted in bearing boxes 39 and 40 formed integral with the portions 27a and 27b of the housing, thus providing a split bearing box for receipt of the shaft assembly, including the differential shaft 30 and the quill shaft 35, permitting the shaft assembly to be mounted as assembled within the housing 27.

The differential shaft 30 is provided with a differential shaft driving spur gear 41 which is keyed to the shaft 30 as indicated at 42. The quill shaft 35 is provided with a driving spur gear 43 which is pressed on and is keyed to the quill shaft 35.

Three cluster spur gears 44, 45 and 46 are mounted on roller bearings 47, on shafts 48. The shafts 48 are carried by a spider 49. The spider 49 is formed in two halves bolted together. The spider 49 is journaled on roller bearings 50 mounted on the quill shaft 35 and roller bearings 51 mounted on the differential shaft 30. The differential shaft end of the spider 49 carries a spur gear 52 which is bolted and keyed to the spider 49.

In order to provide for the driving of the drilling control 6 with steam, gas or like engines, the engine sprocket 8 is keyed as indicated at 53 to the quill shaft 35 outside of the housing 27. The engine drive sprocket 8 is driven from the engine 5 by means of the chain 7.

To provide for the driving of the drilling control 6 by an electric motor, the motor reduction gear shaft 33 is journaled in the housing 27 on roller bearings 54. The motor reduction gear shaft 33 is operatively connected with the quill shaft 35 by means of a spur pinion 55 keyed to the motor reduction gear shaft 33 in position to mesh with a motor reduction drive spur gear 56 keyed as indicated at 57 to the quill shaft 35. Where the assembly is made up for driving by means of a gas, steam or like engine, the motor reduction gear 56 is eliminated from the assembly and a spacer is keyed to the shaft 35 in place of the gear 56.

The rotary drive sprocket 9 is journaled on the differential shaft 30 on roller bearings 58a, and a square jaw clutch 58, splined as indicated at 59 to the shaft 30, is provided for clutching the sprocket 9 to the differential shaft 30.

A square jaw clutch 60 is splined on the opposite end of the differential shaft 30 as indicated at 61 and is clutched to the clutch jaw 62 formed integral with the sprocket 8 when it is desired to provide a direct drive to the differential shaft 30 for the purpose which will hereinafter be set forth.

As a preferred example of differential shaft assembly, the following gear ratios are given, although it is to be understood that these gear ratios are given merely for the purpose of illustration, and we do not intend to in any way limit our invention to the gear ratios set forth.

The gear 41 is a 33-tooth gear, and the gear 43 is a 45-tooth gear. The cluster gears 44, 45 and 46 are formed with the separate spur gear teeth 63 and 64 to mesh with the gears 41 and 43 respectively. The gear 63 is a 37-tooth gear, and the gear 64 is a 25-tooth gear. The gear 52 on the shaft end of the spider 49 is a 64-tooth gear and meshes with a 44-tooth spur gear 65 keyed to the clutch gear shaft 31.

The motor reduction gear 56 is a 68-tooth gear and the driving pinion 55 therefor is a 16-tooth pinion. The sprocket 8 is a 19-tooth sprocket and the rotary sprocket 9 is a 24-tooth sprocket.

The clutch gear shaft 31 is mounted on roller bearings 66 positioned within the split bearing box 67 formed by the lower gear housing 27a and the central gear housing 27b. The clutch gear shaft driving gear 65 is pressed upon and keyed to the clutch gear shaft as indicated at 68.

Four spur gears, 69, 70, 71 and 72, are mounted on the clutch gear shaft 31. Carrying out the preferred illustration as to gear ratios, the gears 69, 70, 71 and 72 are 21-tooth, 25-tooth, 28-tooth and 31-tooth gears, respectively. The gears 69, 70, and 71 are journaled on the shaft 31 on bronze bushings 73. The high speed gear 72 is journaled on the shaft 31 on roller bearings 74.

A pair of multiple jaw double end clutches 75 and 76 are splined on keys 77 and 78 on the clutch gear shaft 31. The multiple jaw double end clutch 75 is splined on the shaft 31 between the low and second speed gears 69 and 70. The multiple jaw double end clutch 76 is splined on the shaft 31 between the third speed gear 71 and the high speed gear 72.

The multiple jaw double end clutch 75 is provided at its opposed ends with clutch faces 79 and 80 to alternately engage the clutch faces 81 and 82 of the low or second speed gears 69 and 70 respectively. The multiple jaw double end clutch 76 is provided at its opposed end with clutch faces 83 and 84 adapted to alternately engage the gear clutch faces 85 and 86 of the third and high speed gears 71 and 72, respectively.

The multiple jaw double end clutches 75 and 76 are splined on the shaft 31 allowing sufficient length of the shaft 31 for either of the clutches to be moved to a neutral position out of engagement with any one of the gears 69, 70, 71 and 72.

A clutch operating mechanism is provided for these multiple jaw double end clutches 75 and 76 which is of such construction as to permit only one of the gears 69, 70, 71 or 72 to be clutched to the clutch gear shaft 31 at a time. The specific construction of this shifter mechanism will be hereinafter described. The clutch gear shaft 31 does not project from the housing 27 and is therefore provided at its end with plates 87 which are bolted to the housing 27 in order to provide a fluid-tight housing for the assembly to prevent lubricant from passing out of the housing.

The take-off shaft 32 is mounted above the clutch gear shaft 31 in bearings 88 mounted in the split bearing boxes 89 formed integral with the central gear housing 27b and the gear housing cover 27c. The take-off shaft is provided with four spur gears, 90, 91, 92 and 93, which are keyed to the take-off shaft 32. Following the gear ratio illustration given, the four gears, 90, 91, 92 and 93 are 37-, 33-, 30- and 27-tooth gears, respectively.

The gear 90 meshes with the gear 69 providing the low speed connection for the take-off shaft 32. The gear 91 meshes with the gear 70; the gear 92 meshes with the gear 71, and the gear 93 meshes with the gear 72, providing the second, third and high speed drive connections to the take-off shaft 32.

The take-off shaft 32 does not project at one end from the housing 27 so a closure plate 94 is bolted to the split bearing box 89 at this end of the housing 27 to enclose the bearing 88 and prevent oil leakage. The plate 94 is counterbored on its inside to hold in place a thrust disc 95 which bears against the end of the shaft 32 and prevents the shaft 32 from moving in that direction. The shaft 32 extends through and beyond the opposite end of the housing 27, and a bearing housing plate 96 is bored to fit loosely on the shaft 32 and is bolted to the split bearing box 89 at this end of the housing 27. A groove is cut into the counterbore of the plate 96 for the reception of packing 97 to prevent oil leakage from this point of the housing 27. The drawworks drive sprocket 15 is keyed to the take-off shaft 32 outside of the housing 27 and drives the line shaft 12 of the drawworks 4 by a chain 16 passing over the line shaft sprocket 17.

While the drawworks herein illustrated is of the two-shaft type, it is obvious that any other form of drawworks may be substituted such, for example, as the three-shaft form of drawworks in which case the sprocket 17 may be mounted on the jackshaft of such drawworks rather than on the line shaft. This latter structure, however, is now so well understood in the art as not to require applicants to specifically point out and describe this structure.

The operation of the gear control 6 is: The quill shaft 35 is rotated either from the sprocket 8 or from the motor reduction gear shaft 33. The weight of the drill pipe 24 holds the spider 49 stationary or slightly drags it backward. This holding of the spider 49 causes the driving gear 43 to rotate the cluster gears 44, and they in turn rotate the shaft gear 41, which, being keyed to the differential shaft 30, causes this shaft to rotate in the same direction as the quill shaft. With the gear ratio given, the differential shaft 30 is caused to rotate at twice the speed of the quill shaft. The rotary clutch 58 being engaged with the rotary sprocket 9, the rotary sprocket 9 is caused to rotate.

The rotary sprocket being connected by means of the chain 10 through the double idler gear 11 and chain 13 to the sprocket 14 of the rotary machine causes the rotary table of the rotary machine to rotate the drill pipe 24 and the bit 25. When the bit 25 meets with a greater resistance than allowed for the speed of rotation of the drill stem 24, it is retarded but the speed of the quill shaft 35 remains constant. The difference in speeds thus set up causes the spider 49 to rotate forward and the forward rotation of the spider causes the gear 65 to rotate, rotating the clutch gear shaft 31. The clutch gear shaft 31 being coupled to the take-off shaft 32 through any one of the series of speed gear connections provided, causes the drawworks drive sprocket 15 to rotate, rotating the drum 22 of the drawworks through any one of the speed connections provided by the sprockets 19, 20 or 21 mounted on the line shaft 12 of the drawworks. This action results in hoisting the bit 25 upwardly in the hole being drilled, thus relieving the strain allowing the rotary machine 3 to again assume its full speed and the bit drops to the bottom, the result being that a condition of equilibrium is set up between the forces acting to rotate the drill stem 24, and the force acting to hoist the drill stem 24 through the differential drive provided on the differential shaft 30 so that the weight imposed upon the bit 25 by the drill stem 24 is just sufficient to balance the torque imposed upon the drill stem 24 by the rotary machine 3.

As there is a considerable stretch in the drill stem 24, there will always be a tension maintained on the cable 23 tending to hoist the drill stem 24 upward, and this force will not become effective to raise the bit 25 until the entire stretch of the drill stem 24 has been compensated for. The taking up of the stretch of the drill stem 24 results in relieving the pressure imposed upon the bit 25 as the bit 25 is rotated, and it is in this manner under actual operation that the relation of lift to torque is established when using our gear control device.

If it should happen that the bit 25 should meet with enough resistance to stop its rotation, the spider 49 will turn in the same direction as the quill shaft 35, but at twice the speed of the quill shaft 35, and thereby quickly hoist the bit 25 upwardly in the hole from the obstruction causing the unusual resistance, eliminating all possibility of twist-off of the drill stem due to the bit becoming stuck in the hole.

For running the drill pipe 32 in and out of the hole as is required for the purpose of change of bits 25, the rotary clutch 58 is disengaged and the clutch 60 is engaged. This locks the shaft 30 and the quill shaft 35 together, causing the shaft 30 to act exactly as though it were a solid shaft.

The four speeds provided between the clutch gear shaft 31 and the take-off shaft 32 are to allow a greater and more equal number of weight supporting ratios when drilling, and a greater number of speeds for hoisting. This greater number of speeds greatly increases the efficiency of the drilling apparatus as it allows the operator to select the speed or weight supporting ratio which, under particular conditions will produce the most efficient drilling of the hole.

The housing 27 is formed as a fluid-tight housing to maintain oil within the housing to a predetermined level so that the gears of the gear control 6 are at all times maintained running in a bath of oil. The cover 27c is provided with a capped oil inlet 99. The central gear housing 27b is likewise provided with a cap oil inlet 100 for permitting inspection of the differential shaft, and the admission of lubricant.

The differential shaft 30 extends through the housing 27 at both ends. The rotary drive sprocket end of the differential shaft 30 is provided at its outer end with a face plate 101 which is counterbored to extend over the shaft 30, and the sliding clutch keys 59 to keep the keys from lifting. Plate 101 is bolted to the end of the shaft 30.

The outer end of the sprocket 9 is provided with an enlarged bore into which a grease retainer ring 102 is fitted, and the grease retainer ring 102 is slotted as indicated at 103 to receive the ends of the keys 59 and hold the keys 59 from cutting into the bearings 58a. The periphery of the ring 102 is grooved to receive packing 104. The ring 102 thus acts as a grease retaining ring and a ring to prevent end movement of the roller bearing 58—A.

On the opposite end of the bearing 58a a retaining ring 105 is mounted in the bore of the sprocket 9 and is provided with an inner peripheral packing groove to maintain grease packing on the shaft 30. The retaining ring 105 engages the outer end of the end plate 106, which is secured to the split bearing box 39. The plate 106 has an internal packing groove for the reception of packing 107 to prevent leakage from the housing 27. The plate 106 provides also an end retainer for the bearing 37. On the exterior end of the rotary drive sprocket 9, an annular brake rim flange 108 is formed over which any suitable or desirable form of brake may be trained, as shown in Figures 8 and 9.

Within the housing 27 a thrust washer 109 is interposed between the inner face of the housing 27 and the hub of the gear 52, and this thrust washer 109 acts as an end retainer for the bearings 37 and 51.

The shaft 30 is of enlarged diameter within the bearing 51 to form a shoulder 110 to engage and hold the keys 42 from endwise movement. The hub 111 of the gear 52 is formed with an inwardly extending annular retaining flange 112, acting as an end retainer for the bearing 51. Interposed between the flange 112 and the hub of the gear 41 is a thrust washer 113. Interposed between the gear 41 and the gear 43 is a thrust washer 114 which acts as an end retainer for the bearing 36 protecting the bearing 36 from the gear 41.

Interposed between the cluster gears 44, 45 and 46 and the spider 49 are thrust washers 115 which likewise act as end retainers for the roller bearings 47. The spider 49 at the quill shaft end of the shaft 30 is at its opposite ends provided with thrust washers 116 separating the spider from the gear 56 and the gear 43. The thrust washer 117 is interposed between the gear 56 and the housing 27 and acts as a retainer for the roller bearing 38, and also to prevent the key 57 cutting into the bearing 38. The plate 118 is secured to the outer face of the split bearing box 40, acting as an outer retainer for the bearing 38 and being provided with an inner packing groove to pack the quill shaft 35 preventing leakage of lubricant from the housing 27.

Interposed between the face plate 118 and the sprocket 8 is a bearing washer 119. Mounted within the end of the quill shaft is a grease retaining ring 120 which acts to retain the quill shaft bearing 36, and likewise to prevent the spline 61 upon which the clutch 60 is mounted from cutting into the bearings 36. The inner periphery of the ring 120 is provided with a packing groove into which packing 121 is fitted to prevent lubricant leakage at this point. The motor reduction shaft is passed into the gear housing cover 27c through flanged openings 122 and 123 formed at the opposite ends of the cover 27c. The flanged openings are large enough to permit entry of the shaft 33 with the pinion 35 assembled thereon into the cover 27c. The bearings 54 are mounted in bearing rings 124, which are secured to the ends of the flanges of the flanged openings 122 and 123 and packing glands 125 are provided for the maintenance of a fluid-tight connection at this point. A coupler 126 is keyed to the motor reduction gear shaft 33 and provides a means for coupling the shaft 33 to a reduction gear unit.

Means are provided for shifting the rotary sprocket clutch 58, which means are preferably of the following construction and extend from the control unit 6 to a point within the derrick 1, accessible to the driller.

Figure 14:
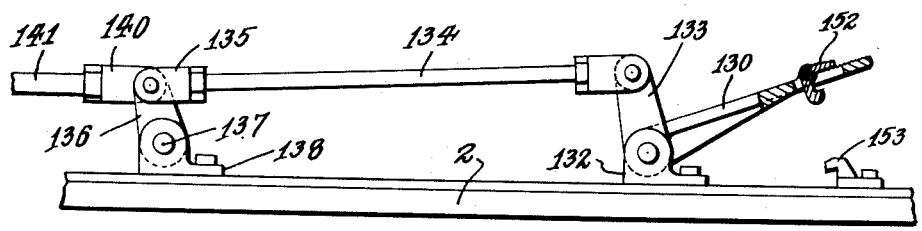
Figure 14 is a detached detail view partly in section of the rotary sprocket clutch shifter.

Referring particularly to Figures 1, 8, 9, 14 and 15, the rotary sprocket clutch pedal 130 is positioned on the floor 2 of the derrick 1 adjacent the control pedals 131 which control the speed connections from the line shaft 12 to the drum shaft 18 of the drawworks 4. The pedal 130 is pivotally supported on the floor 2 in a bracket 132 and is provided with an arm 133 pivotally connected to a rod 134. The rod 134 is in turn connected to a turn buckle 135 which is pivotally connected to the arm 136 of a shaft 137. The shaft 137 is pivotally mounted in a bracket 138 located at the rear of the drum shaft 18. The shaft 137 is provided with an arm 139 which is pivotally connected to a turn buckle 140. The turn buckle 140 is in turn adjustably connected to a connecting rod 141 extending from the bracket 138 to the rear skid 29 on which the gear control 6 is mounted. The rod 141 is at its rear end connected by a bell crank 142 to a transversely extending rod 143. The rod 143 extends to the rear of the gear control 6 and is connected at its opposite end to a turn buckle 144. The turn buckle is pivotally connected to the end of the rotary clutch shifter fork 145. The rotary clutch shifter fork 145 is pivotally supported as indicated at 146 to a bracket 147, which bracket 147 is secured as indicated at 150 to the housing 27. The opposite end of the shifter fork 145 engages the clutch 58 as indicated at 148 to shift the clutch 58 longitudinally of the differential shaft 30.

The rotary clutch pedal 130 is provided with means for latching the same to the floor 2 to lock the clutch 58 engaged with the rotary machine drive sprocket 9. Springs 151 connect the turn buckle 144 with the housing 27 for the purpose of yieldably urging the clutch 58 out of engagement with the sprocket 9 when the pedal 130 is released. A dog 152 is pivotally mounted on the pedal 130 to engage a catch 153 secured to the floor 2 of the derrick to hold the pedal 130 in clutch-engaging position.

As illustrated in Figures 8 and 9, the rotary sprocket 9 is provided with a brake for holding this sprocket from rotation when the clutch 58 is released. This brake includes a pair of brake shoes 154 which engage the brake rim 108. The brake shoes 154 are pivotally mounted as indicated at 155 upon a transverse base extension of the bracket 147. A bracket actuating rod 156 is slidably mounted in bearing projection 157 of the bracket 147, and springs 158 are interposed between the bearing projection 157 and the arms 159 of the brake shoes 154. The brake actuating rod 156 is threaded at its outer end to adjustably receive a cam nut 160. The cam nut 160, as well as the actuating head 161, are secured to the opposite end of the rod 156 with cam surfaces 162 adapted to engage corresponding cam surfaces 163 formed on the arms 159 to actuate the brake shoes 154 as the rod 156 is rotated.

The rotation of the rod 156 is accomplished by a brake actuating shaft 164, which is journaled in a bearing extension 165 of the bracket 147. The brake actuating shaft 164 is provided with a square head 166 which fits within a square recess 167 formed in the end of the head 161. The shaft 164 is rotated by means of an arm 168 which is secured to the end of the shaft 164 by means of a key 169. The opposite end of the arm 168 is pivotally connected as indicated at 170 to a lever 171. The lever 171 is pivotally secured as indicated at 172 to an arm extension 173 of the turn buckle 144. By this manner of connection when the pedal 130 is released, the springs 151 act to throw the clutch 158 out of engagement with the sprocket 9. As the clutch 158 is released, the brake shoes 154 are actuated to engage the brake rim 108 of the sprocket 9 to arrest rotation of the sprocket 9.

The means for actuating the change speed mechanism provided between the gear shaft 31 and the take-off shaft 32 for actuating the multiple jaw double end clutches 55 and 56 is preferably of the following construction:

The double end clutches 75 and 76 are provided within the housing 27 with shifter forks 174 and 175, respectively.

The shifter fork 174 is secured to a shifter fork rod 176 which is positioned for longitudinal movement. The shifter fork 175 is secured to a similar mounted shifter rod 177. The rods 176 and 177 are mounted in a varying bracket 178 at one end and passed through a lock plate bracket 179 which is secured by means of bolts to the integral annular flange 180 of the lower gear housing 27a. The shifter rods 176 and 177 project through bores formed through the plate 179 and through a stuffing box 181 provided for packing the rods 176 and 177 to the plate 179. On the exterior of the housing 27a, rods 176 and 177 are pivotally connected as indicated at 182 and 183, respectively, to actuating rods 184 and 185. The rods 184 and 185 are secured to bell crank levers 186 and 187 mounted on the transverse skid 188. The bell crank levers 186 and 187 are connected to connecting rods 189 and 190, which are in turn connected to bell crank levers 191 and 192 secured to the control plate 193. The opposite arms of the bell crank levers 191 and 192 are connected to shaft rods 194 and 195. The lever actuating rods 194 and 195 are pivotally connected through turn buckles 196 to shifter bars 197 and 198 respectively. The shifter bars 197 and 198 are slidably mounted for longitudinal motion only in a shifter bar housing 199 of the bracket 200. The bracket 200 is secured to the control plate 193 adjacent the drawworks control pedals 131.

A shifter lever 201 passes through a ball 202 mounted in a socket 203 formed at the upper end of the bracket 200. The shifter lever 201 extends through the ball 202 and is adapted to be shifted laterally as viewed in Figure 13, to cause the engaging end 204 thereof to engage within the socket 205 or the socket 206 formed in the shifter plates 197 and 198 respectively. By this means a single shifter lever 201 is provided which may be caused to engage separately either the shifter bar 197 or the shifter bar 198 to move such shifter bars longitudinally independently.

In order to hold the clutches 75 or 76 in engagement as determined from the shifter lever 201, and also to prevent more than one of such clutches being engaged at a time, the following lock means are provided:

The shifter fork rod 176 is provided with a series of locking detents, a low speed locking detent 207, a pair of neutral locking detents 208, and a second speed locking detent 209. The rod 177 is provided with a third speed locking detent 210, a pair of neutral locking detents 211, and a high speed locking detent 212. Locking dogs 213 and 214 are provided for the rods 176 and 177 respectively. Each of these locking dogs are slidably mounted in bores 215 formed in the plate 179, and yieldably urged to locking position by means of springs 216 engaging the outer end of the locking detents 213 and 214 respectively, and held adjustably within the bores 215 by means of plugs 217 threaded into the bores 215.

Mounted in a transverse bore 218 between the rods 176 and 177 is a locking dog 219. This locking dog is slidably mounted in position and engages alternately the neutral detents 208 or 211 formed in the rods 176 and 177 respectively. It will be observed with the dog 219 engaged in neutral detent of one of the rods 176 or 177, that this rod can not be moved longitudinally to shift the clutch with which it is connected, and that no one of the rods 176 or 177 may be shifted without moving the dog 219 into the neutral detent of the opposite rod. Therefore, it is not possible to cause both of the clutches 75 and 76 to be engaged at a single time.

In order to shift the clutch 60 for the drive sprocket 8, a shifter fork 220 is provided, which shifter fork 220 is pivotally secured to the housing 27 and is connected at its lower end to a shifter rod 221. The shifter rod 221 is adjustably connected through a turn buckle 222 to a bell crank lever 223. The opposite arm of the bell crank lever 223 is pivotally connected to a connecting rod 224, which connecting rod 224 is at its opposite end connected to one arm of a bell crank lever 225. The bell crank lever 225 is pivotally supported on the control plate 193.

The opposite arm of the bell crank lever 225 is connected to a shifter rod 226. The shifter rod 226 is pivoted through a turn buckle 227 to a drive sprocket shifter lever 228. The lever 228 is pivotally mounted on a pin 229 within the bracket 200. The drive sprocket shifter lever 228 is provided with a pivotally mounted dog 231, which engages a ratched segment 232 secured to the bracket 200. The dog 231 is yieldably urged downward to engage the segment 232 by means of a spring 233 connected between the lever 228 and the opposite end of the dog 231. The segment 232 is provided with a clutch engaging detent 234 and a detent 235 for holding the lever 228 when the clutch 60 is disengaged from the sprocket 8.

Having fully described our invention, it is to be understood that we do not wish to be limited to the details herein set forth, but our invention is of the full scope of the appended claims.

We claim:

1. In a rotary drilling control, the combination of a housing, a differential shaft journaled in the housing, a clutch gear shaft mounted in the housing, a rotary drive sprocket mounted on the differential shaft, a quill shaft mounted on the differential shaft, means for driving the quill shaft, a spider journaled at one end on the quill shaft and at its opposite end on the differential shaft, a plurality of cluster gears rotatably supported by the spider, a driving gear secured to the quill shaft, a driving gear secured to the differential shaft, said driving gears meshing with the cluster gears, a clutch gear drive gear secured to the spider, a gear secured to the clutch gear shaft to mesh with the clutch gear drive gear, a take-off shaft journaled in the housing, a gear connection between the clutch gear shaft and the take-off shaft, and a drawworks drive sprocket secured to the take-off shaft.

2. In a drilling control, the combination of a housing, a differential shaft journaled in the housing, a quill shaft journaled on the differential shaft, means for driving the quill shaft, a rotary drive sprocket secured to the differential shaft, a spider journaled on said shafts, a plurality of cluster spur gears rotatably supported by said spider, spur gears secured to the quill shaft and the differential shaft respectively to mesh with the said cluster gears, a drawworks drive sprocket, and a multiple speed gear connection between the spider and the drawworks drive sprocket.

3. In a drilling control, the combination of a differential shaft, a quill shaft, means for driving one of said shafts, a rotary drive sprocket driven by the other of said shafts, a spider, a drawworks drive sprocket driven from said spider, a plurality of cluster spur gears rotatably supported by said spider, a spur gear secured to the differential shaft, a spur gear secured to the quill shaft, and the latter said gears meshing with said cluster gears.

4. In a drilling control, the combination of a housing, a differential shaft journaled in the housing, a quill shaft journaled on the differential shaft, means for driving one of said shafts, a rotary drive sprocket driven by the other of said shafts, a clutch gear shaft journaled in the housing, a rotary drawworks drive sprocket driven from the clutch gear shaft, a spider, a plurality of cluster spur gears rotatably carried by said spider, a spur gear secured to the differential shaft, a spur gear secured to the quill shaft, the differential shaft spur gear and the quill shaft spur gear meshing with said cluster gears, and means for driving the clutch gear shaft from said spider.

5. In a drilling control, the combination of a housing rotatably supporting a differential shaft, a quill shaft, means for driving one of said shafts, a rotary drive sprocket driven by the other of said shafts, a spider, a clutch gear shaft, means carried by the spider for driving the clutch gear shaft, a plurality of cluster spur gears rotatably carried by said spider, a spur gear secured to the differential shaft, a spur gear secured to the quill shaft, the differential shaft and quill shaft spur gears meshing with said cluster gears, a take-off shaft journaled in the housing, spur gears secured on the clutch gear take-off shaft to mesh with the clutch gear spur gears, clutch means for clutching the clutch gear shaft spur gears to the clutch gear shaft, and a drawworks drive sprocket secured to the take-off shaft.

6. In a rotary drilling control, the combination of a housing, a differential shaft journaled in the housing, a quill shaft journaled on the differential shaft, means for driving the quill shaft, a rotary drive sprocket journaled on the differential shaft, clutch means for clutching the rotary drive sprocket to the differential shaft, a spider journaled on said shafts, a plurality of cluster spur gears rotatably supported by said spider, spur gears secured to the quill shaft and the differential shaft respectively, to mesh with said cluster gears, a take-off shaft journaled in the housing, a drawworks drive sprocket mounted on the take-off shaft, and a multiple speed gear connection between the spider and the take-off shaft.

7. In a rotary drilling control, the combination of a housing, a differential shaft journaled in the housing, a clutch gear shaft journaled in the housing, a rotary drive sprocket journaled on the differential shaft, clutch means for clutching the rotary drive sprocket to the differential shaft, a quill shaft journaled on the differential shaft, means for driving the quill shaft, a spider journaled at one end on the quill shaft and at its opposite end on the differential shaft, a plurality of cluster gears rotatably supported by the spider, a driving gear secured to the quill shaft, a driving gear secured to the differential shaft, said driving gears meshing with the cluster gears, a clutch gear drive gear secured to the spider, a gear secured to the clutch gear shaft to mesh with the clutch gear drive gear, a take-off shaft journaled in the housing, a multiple speed drive connection between the clutch gear shaft and the take-off shaft, a drawworks drive sprocket secured to the take-off shaft, and means for locking the quill shaft and the differential shaft together when the rotary drive sprocket clutch is disengaged.

8. In a drilling control, the combination of a differential shaft, a quill shaft journaled on the differential shaft, means for driving the quill shaft, a rotary drive sprocket secured to the differential shaft, a spider journaled on said shafts, a plurality of cluster spur gears rotatably supported by said spider, spur gears secured to the quill shaft and the differential shaft respectively to mesh with said cluster gears, a clutch gear shaft, a gear connection between the spider and the clutch gear shaft, a plurality of variable speed gears journaled on the clutch gear shaft, clutch means for clutching one of said variable speed gears to the clutch gear shaft, a take-off shaft, the take-off shaft having a plurality of driven gears corresponding to and meshing with the variable speed gears journaled on the clutch gear shaft, and a drawworks drive sprocket secured to the take-off shaft.

9. In a drilling control, the combination of a differential shaft, a quill shaft, a spur gear differential operatively connecting said shafts, a rotary drive sprocket mounted on one of said shafts, the spur gear differential including a spider, a clutch gear shaft, means for driving the clutch gear shaft from the spider, a plurality of spaced variable speed gears journaled on the clutch gear shaft, multiple jaw double end clutches interposed between the variable speed gears journaled on the clutch gear shaft for clutching the variable speed gears one at a time to the clutch gear shaft, means for actuating the multiple jaw double end clutches to clutch one of the variable speed gears to the clutch gear shaft, and a drawworks drive sprocket secured to the take-off shaft.

10. In a drilling control, the combination of a differential shaft, a quill shaft, a spur gear differential operatively connecting said shafts, a rotary drive sprocket mounted on one of said shafts, the spur gear differential including a spider, a clutch gear shaft, means for driving the clutch gear shaft from the spider, a plurality of spaced variable speed gears journaled on the clutch gear shaft, multiple jaw double end clutches interposed between the variable speed gears journaled on the clutch gear shaft for clutching the variable speed gears one at a time to the clutch gear shaft, an actuating means for actuating the multiple jaw double end clutches carried by the clutch gear shaft, including a lock means for holding one of said multiple jaw double end clutches disengaged when the other of said multiple jaw double end clutches is engaged, and a drawworks drive sprocket secured to the take-off shaft.

11. In a drilling control, the combination of a differential shaft, a quill shaft, means for driving one of said shafts, a rotary drive sprocket driven by the other of said shafts, a spider, a drawworks drive sprocket driven from said spider, a plurality of cluster spur gears rotatably carried by said spider, a spur gear secured to the differential shaft, a spur gear secured to the quill shaft, the latter said spur gears meshing with said cluster gears, the said spur gears and the cluster gears being of such gear ratio as to cause the differential shaft to rotate at twice the speed of the quill shaft when the spider is held stationary.

12. In a drilling control, the combination of a housing formed in three parts, a differential shaft journaled in the housing, a quill shaft journaled on the differential shaft, a clutch gear shaft journaled in the housing, the housing being divided on a plane passing through the centers of the differential shaft and the clutch gear shaft, a take-off shaft journaled in the housing above the clutch gear shaft, the housing being divided on a plane passing through the center of the take-off shaft, the three divided portions of the housing being secured together, means for driving the quill shaft, a rotary drive sprocket secured to the differential shaft on the exterior of the housing, a spider journaled on the differential shaft and the quill shaft, a plurality of cluster spur gears rotatably supported by said spider, spur gears secured to the quill shaft and the differential shaft relatively to mesh with the cluster gears, means for driving the clutch gear shaft from the spider, a drawworks drive sprocket secured to the take-off shaft on the exterior of the housing, and a multiple speed gear connection between the clutch gear shaft and the take-off shaft.

13. In a drilling control, the combination of a housing, a differential shaft journaled in the housing, a quill shaft journaled on the differential shaft, means for driving the quill shaft, a rotary drive sprocket secured to the differential shaft, a spider journaled on said shafts, a plurality of cluster spur gears rotatably supported by said spider, spur gears secured to the quill shaft and the differential shaft respectively to mesh with the said cluster spur gears, a reduction gear shaft journaled in the housing, means for driving the quill shaft from the reduction gear shaft, a drawworks drive sprocket, and a multiple speed gear connection between the spider and the drawworks drive sprocket.

14. In a rotary drilling control, the combination of a housing, a differential shaft journaled in the housing, a quill shaft journaled on the differential shaft, means for driving the quill shaft, a sprocket journaled on the quill shaft, a clutch for clutching the sprocket to the quill shaft, a spider journaled on the quill shaft and the differential shaft, a plurality of cluster spur gears rotatably supported by said spider, spur gears secured to the quill shaft and the differential shaft respectively to mesh with the said cluster gears, a rotary drive sprocket journaled on the differential shaft, means for clutching the rotary drive sprocket to the differential shaft, a drawworks drive sprocket, and a multiple speed gear connection between the spider and the drawworks drive sprocket.

15. In a drilling control, the combination of a housing, a differential shaft journaled in the housing, a quill shaft journaled on the differential shaft, means for driving the quill shaft, a spider journaled on said shafts, a plurality of cluster spur gears rotatably supported by said spider, spur gears secured to the differential shaft and the quill shaft respectively to mesh with the said cluster spur gears, a rotary drive sprocket journaled on the differential shaft, clutch means for clutching the rotary drive sprocket to the differential shaft, a brake rim secured to the rotary drive sprocket, a brake mounted on the brake rim, means for actuating the brake to hold the rotary drive sprocket stationary when the clutch is disengaged, a drawworks drive sprocket, and multiple speed gear connection between the spider and the drawworks drive sprocket.

16. The combination with a drilling control, of a differential shaft assembly adapted to be mounted as a unit in a housing, including a differential shaft, a quill shaft, roller bearing means for rotatably supporting the assembly of the quill shaft and the differential shaft, means for driving the differential shaft, a spider, roller bearings mounted on the quill shaft and the differential shaft respectively for rotatably supporting the spider, a plurality of cluster gears, cluster gear shafts secured to the spider, roller bearings for rotatably supporting the cluster gears, a quill shaft driven gear secured to the quill shaft and journaled on the differential shaft to mesh with the cluster gears, a differential shaft driving gear secured to the differential shaft to mesh with said cluster gears, a rotary drive sprocket secured to the differential shaft, and a drawworks drive gear secured to and driven by the said spider.

17. In a rotary drilling control, the combination of a housing, a differential shaft assembly adapted to be mounted as a unit in the housing, said differential shaft unit including a differential shaft, a quill shaft journaled on the differential shaft, roller bearing means for rotatably supporting the quill shaft and the differential shaft in said housing, means for driving the quill shaft, a rotary drive sprocket secured to the differential shaft, a spider journaled on said shafts, a plurality of cluster spur gears rotatably supported by said spider, spur gears secured to the quill shaft and the differential shaft respectively to mesh with the said cluster spur gears, a drawworks drive sprocket, and a multiple speed gear connection mounted in said housing between the spider and the drawworks drive sprocket.

18. In a drilling control, the combination of a housing, a differential shaft journaled in the housing, a quill shaft journaled on the differential shaft, means for driving the quill shaft, a rotary drive sprocket secured to the differential shaft, a spider journaled on said shafts, a plurality of cluster spur gears rotatably supported by said spider, spur gears secured to the quill shaft and differential shafts respectively to mesh with the cluster spur gears, a clutch gear shaft journaled in the housing in advance of the differential shaft, a take-off shaft journaled in the housing above the clutch gear shaft, a gear drive connection between the spider and the clutch gear shaft, a multiple speed gear connection between the clutch gear shaft and the take-off shaft, and a drawworks drive sprocket secured to the take-off shaft.

19. In a drilling control, the combination of a differential shaft, a quill shaft journaled on the differential shaft, means for driving one of said shafts, a rotary drive sprocket driven by the other of said shafts, a rotary drawworks drive sprocket, and a spur gear differential journaled on the differential shaft and the quill shaft and operatively connecting the differential shaft, the quill shaft and the drawworks drive sprocket.

Signed at Torrance, Calif., this 21st day of May, 1931.

DAVID SINCLAIR FAULKNER.
LEWIS EMANUEL ZERBE.